(12) United States Patent
Thelin et al.

(10) Patent No.: US 11,000,903 B2
(45) Date of Patent: May 11, 2021

(54) BLADE, TOOL AND METHOD OF GROOVING A METALLIC WORKPIECE

(71) Applicant: SECO TOOLS AB, Fagersta (SE)

(72) Inventors: Jimmy Thelin, Fagersta (SE); Jonas Thuresson, Fagersta (SE); Mats Jonsson, Hedemora (SE)

(73) Assignee: SECO TOOLS AB, Fagersta (SE)

( * ) Notice: Subject to any disclaimer, the term of this patent is extended or adjusted under 35 U.S.C. 154(b) by 25 days.

(21) Appl. No.: 16/086,836

(22) PCT Filed: Mar. 1, 2017

(86) PCT No.: PCT/EP2017/054809
§ 371 (c)(1),
(2) Date: Sep. 20, 2018

(87) PCT Pub. No.: WO2017/162416
PCT Pub. Date: Sep. 28, 2017

(65) Prior Publication Data
US 2020/0324344 A1    Oct. 15, 2020

(30) Foreign Application Priority Data

Mar. 24, 2016 (EP) .................................. 16162258.4

(51) Int. Cl.
*B23B 29/04* (2006.01)
*B23B 29/02* (2006.01)
*B23B 27/08* (2006.01)

(52) U.S. Cl.
CPC .......... *B23B 29/043* (2013.01); *B23B 29/022* (2013.01); *B23B 27/08* (2013.01); *B23B 2205/02* (2013.01); *B23B 2205/12* (2013.01); *B23B 2250/16* (2013.01)

(58) Field of Classification Search
CPC ... B23B 27/002; B23B 27/086; B23B 27/083; B23B 2250/16; B23B 29/043; B23C 5/003; B23C 5/006; B23C 5/08; B23C 2210/02; B23C 2260/04; B23C 2250/16
See application file for complete search history.

(56) References Cited

U.S. PATENT DOCUMENTS 3,292,237 A * 12/1966 Fisher ................... B23B 27/002
                                                         407/120
4,588,333 A    5/1986 Gustafson
(Continued)

FOREIGN PATENT DOCUMENTS

CN    202207814 U    5/2012
CN    104159690 A    11/2014
(Continued)

OTHER PUBLICATIONS

Machine Translation of IDS provided foreign reference JP 08252715, pp. 2-3. (Year: 2020).*

*Primary Examiner* — Nicole N Ramos
(74) *Attorney, Agent, or Firm* — Corinne R. Gorski

(57) ABSTRACT

A grooving blade for chip removing machining includes a cutting insert pocket and a damping arrangement fixed to the blade. The damping arrangement projects laterally with respect to at least one major surface of the blade. A grooving tool and a method of grooving a metallic workpiece are also disclosed.

11 Claims, 5 Drawing Sheets

(56) References Cited

U.S. PATENT DOCUMENTS

| | | | | |
|---|---|---|---|---|
| 4,998,851 | A * | 3/1991 | Hunt | B23B 27/007 |
| | | | | 188/268 |
| 6,113,319 | A * | 9/2000 | Hansson | B23B 29/043 |
| | | | | 407/109 |
| 8,240,961 | B2 * | 8/2012 | Mihic | B23B 29/00 |
| | | | | 408/143 |
| 8,821,082 | B1 * | 9/2014 | Bolin | B23B 27/007 |
| | | | | 409/132 |
| 8,978,527 | B2 * | 3/2015 | Yang | B23B 27/002 |
| | | | | 82/163 |
| 2005/0214087 | A1 * | 9/2005 | Agapiou | B23B 31/006 |
| | | | | 409/141 |
| 2006/0291973 | A1 * | 12/2006 | Claesson | B23B 27/002 |
| | | | | 409/234 |
| 2011/0182679 | A1 * | 7/2011 | Bierl | B23B 31/026 |
| | | | | 407/53 |
| 2011/0229278 | A1 * | 9/2011 | Sjoo | B23C 5/003 |
| | | | | 407/40 |
| 2012/0003055 | A1 * | 1/2012 | Sasaki | F16F 15/08 |
| | | | | 408/143 |
| 2014/0321926 | A1 * | 10/2014 | Sadikov | B23B 27/10 |
| | | | | 407/11 |
| 2015/0056025 | A1 * | 2/2015 | Guo | B23C 5/003 |
| | | | | 407/33 |
| 2015/0165531 | A1 * | 6/2015 | Miyamoto | B23C 5/006 |
| | | | | 407/51 |
| 2016/0045960 | A1 | 2/2016 | Hecht | |
| 2017/0173701 | A1 * | 6/2017 | Hecht | B23B 27/1666 |

FOREIGN PATENT DOCUMENTS

| | | |
|---|---|---|
| JP | H08252715 A | 10/1996 |
| JP | 2003062703 A | 3/2003 |
| JP | 2003062704 A | 3/2003 |
| JP | 2011042007 A | 3/2011 |
| WO | 2016024266 A1 | 2/2016 |

* cited by examiner

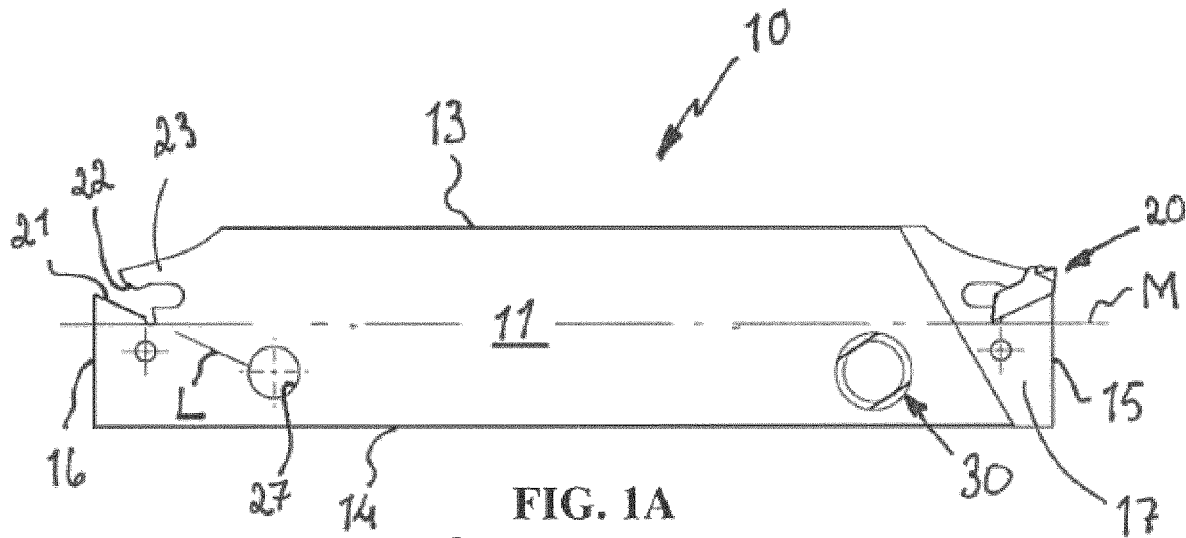
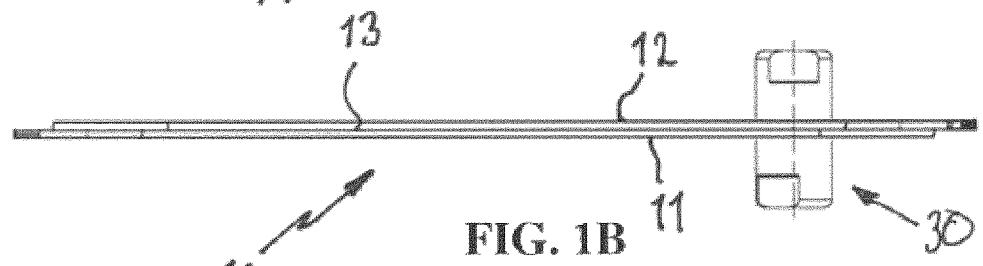
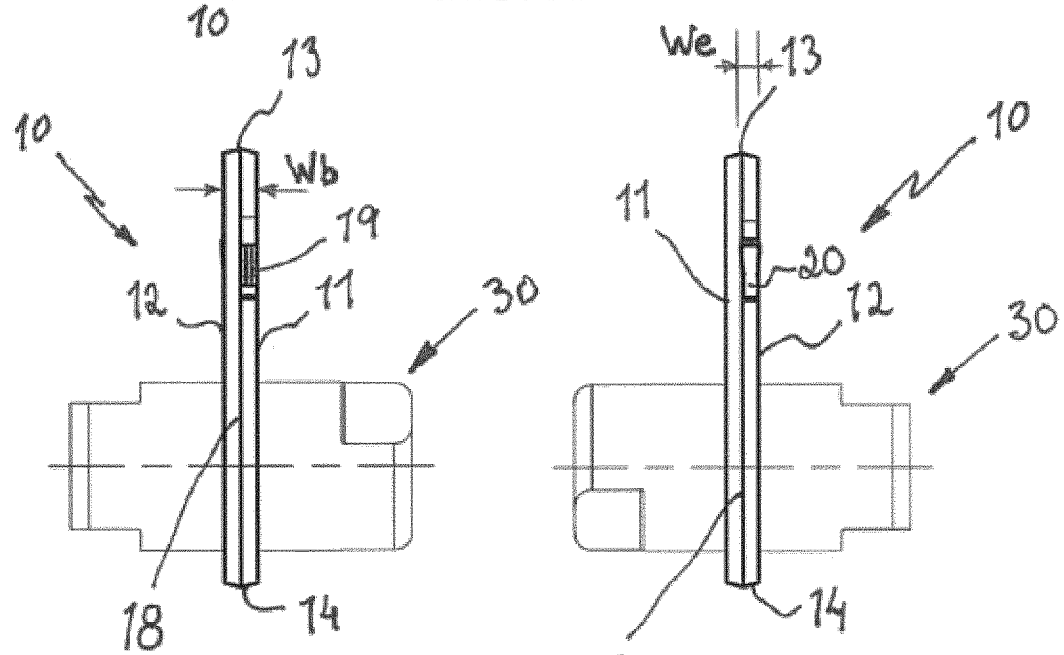
FIG. 1A
FIG. 1B
FIG. 1C
FIG. 1D

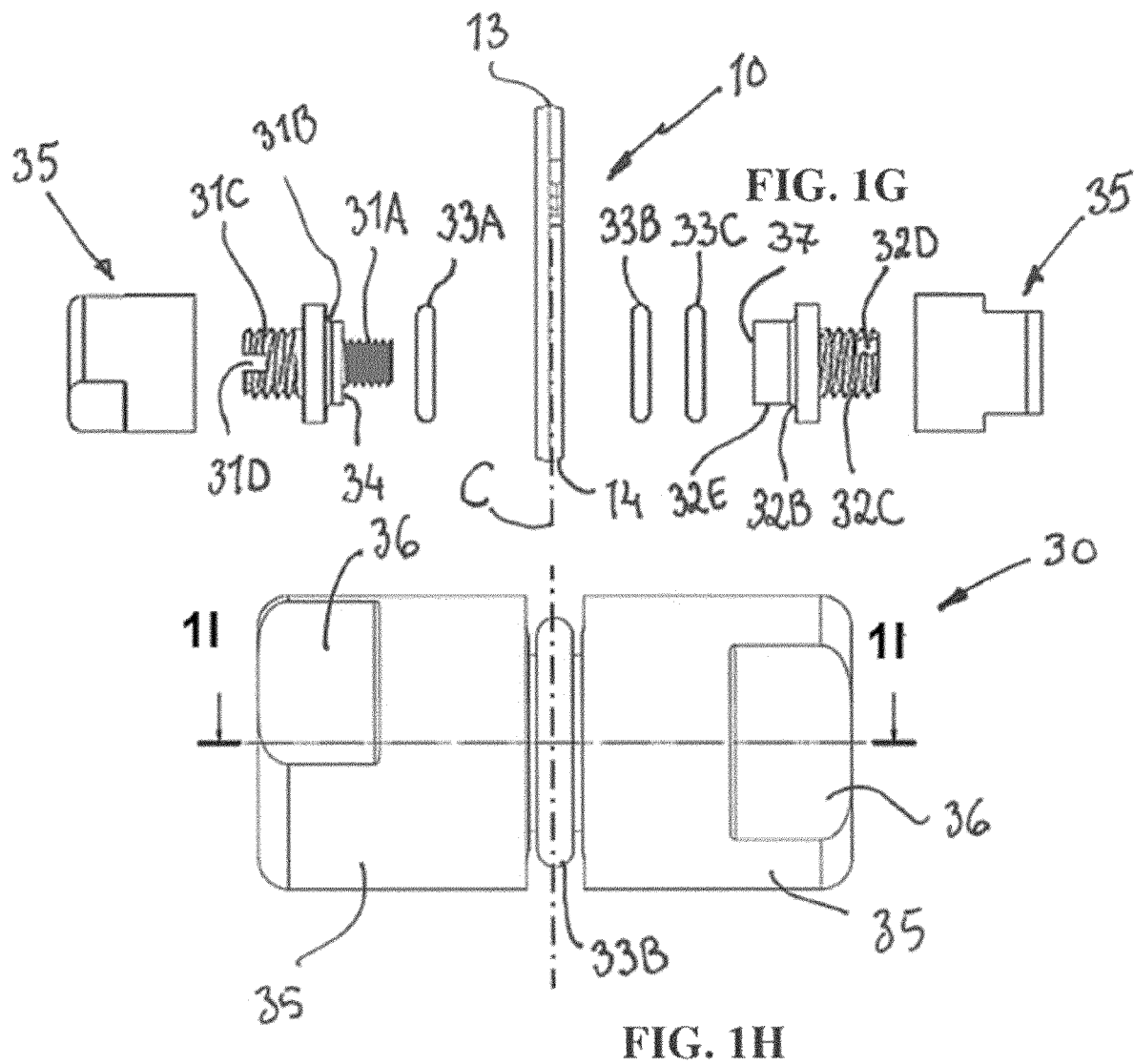
FIG. 1G
FIG. 1H
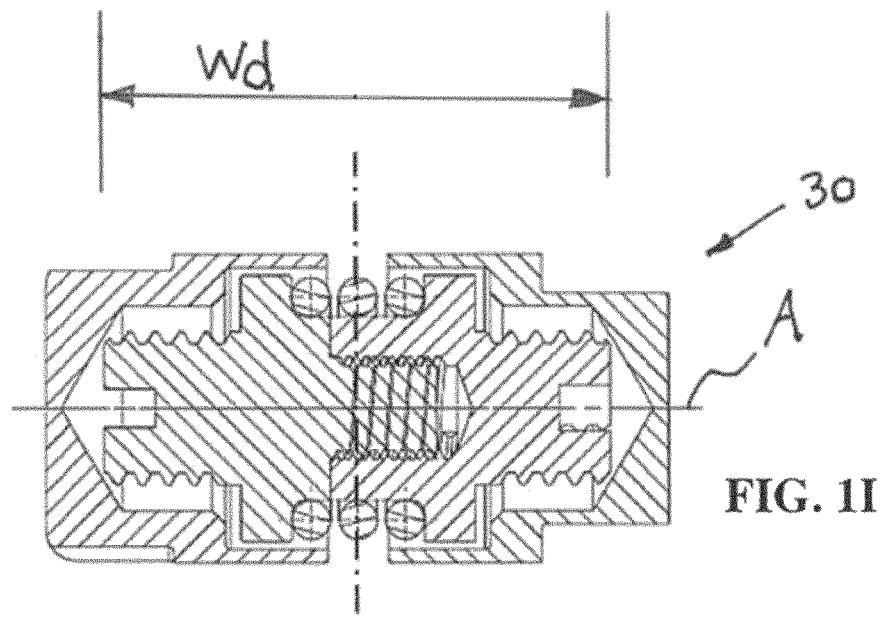
FIG. 1I

BLADE, TOOL AND METHOD OF GROOVING A METALLIC WORKPIECE

RELATED APPLICATION DATA

This application is a § 371 National Stage Application of PCT International Application No. PCT/EP2017/054809 filed Mar. 1, 2017 claiming priority to EP 16162258.4 filed Mar. 24, 2016.

FIELD OF THE INVENTION

The present invention relates to a grooving blade and a grooving tool for metal chip removing machining, and a method of grooving a metallic workpiece

BACKGROUND

At grooving and/or parting operations tools are often used that comprises a blade holding a replaceable cutting insert, such as disclosed in U.S. Pat. No. 4,588,333, the disclosures of which are incorporated herein by reference. In a parting operation, there is material on both sides of the insert. This means that the tools used are narrow and that the length of the toolholder increases with an increased workpiece diameter. Therefore, stability becomes a critical factor. The blade is formed by a relatively thin plate having a pocket for the cutting insert. The cutting insert is clamped in the pocket by means of the resilient force arising from bending of a clamping arm. Vibrations or oscillations typically arise during machining as a consequence of the dynamic stiffness of the blade being weak.

Vibrations cause poor surfaces and reduce tool-life. Vibration tendency is one consequence of the cutting forces. In addition to tool deflection due to large overhang, these can be affected by variations in the cutting process such as varying working allowance or material conditions as well as the formation of built up edges. The design of the cutting insert geometry can be able to provide smooth chip breaking. Combined with the use of a positive rake angle, higher cutting speeds generally have a favorable influence on the cutting forces/vibrations. The quality of the toolholder and its ability to securely hold the cutting insert is one relevant factor. WO2016024266 and JP2003062703 disclose tools having damping means. Although many parameters have been optimized for reducing vibrations there is still a need for improvements.

It is desirable to further reduce poor surfaces and improve tool-life. It is further desirable to reduce vibrations at grooving while still using a cutting insert geometry that is optimized for other technical effects, such as chip breaking.

SUMMARY

According to an aspect of the present invention, a grooving blade has a cutting insert pocket, wherein a damping means is fixed to the blade and wherein the damping means projects laterally with respect to at least one major surface of the blade for damping of vibrations during machining, and remote from the work piece.

According to an aspect of the present invention, the damping means projects from both major surfaces of the blade for optimized damping of vibrations.

According to an aspect of the present invention, the grooving blade has a largest width and comprises a damping means having a width which is greater than the width of the blade thereby allowing freedom in choosing damper configuration.

According to an aspect of the present invention, the largest width of the damping means is 2 to 15 times greater than the width of the blade allowing further freedom in choosing damper configuration.

According to an aspect of the present invention, the damping means is releaseably fixed to the blade for optional usage.

According to an aspect of the present invention, the blade has at least one lateral through hole accommodating only a portion of the damping means such that the damping means can be made relatively large.

According to an aspect of the present invention, the grooving blade comprises opposing first and second major surfaces extending between parallel first and second longitudinal mounting edges and between opposing first and second end edges, which extend transverse to the longitudinal mounting edges, and wherein a cutting insert pocket is associated with the first longitudinal mounting edge and the first end edge to make the blade compatible with most common tool holders.

According to an aspect of the present invention, a blade passageway configured for conveyance of coolant extends from a blade inlet aperture formed in at least one of the side surfaces to an outlet aperture located at the cutting insert pocket and wherein the blade passageway is spaced from the damping means to flush the cutting insert without obstructions.

According to an aspect of the present invention, the dampening means is intersected by a straight line which forms an imaginary extension of a lower supporting surface of the pocket to create space for manipulating the cutting insert.

According to another aspect of the present invention, a grooving tool for metal chip removing machining comprises such a grooving blade and at least one cutting insert fixed to the pocket therein for damping of vibrations during machining, and remote from the work piece.

According to an aspect of the present invention, the cutting insert has a cutting edge with a width, said width being smaller than a largest width of the blade to make narrow slots of good quality.

According to an aspect of the present invention, the cutting insert has a cutting edge with a width, and the grooving blade has a largest width and comprises a damping means having a width which is greater than the width of the cutting edge to further improve the slot quality.

According to an aspect of the present invention, the damping means has a center axis and the cutting insert has an active cutting edge and an insert length, and the center axis is located at least one insert length away from the active cutting edge to avoid interference with the work piece.

According to an aspect of the present invention, the damping means comprises a screw connection or one or more magnets for making the damping means versatile.

According to further aspect of the present invention, a method of grooving a metallic workpiece with such a grooving tool comprises the steps of moving the grooving tool towards a rotating workpiece such that a cutting edge thereof produces a groove by removal of chips, and maintaining the movement of the grooving tool until desired groove depth is obtained while keeping the damping means remote from the workpiece.

At least some of these aspects have been achieved by a grooving blade, a grooving tool and a method of grooving a metallic workpiece as defined in the appended claims.

BRIEF DESCRIPTION OF THE DRAWINGS

The features and advantages of the present invention are well understood by reading the following detailed description in conjunction with the drawings in which like numerals indicate similar elements and in which:

FIG. 1A shows a tool according to the present invention, in a side view, having a blade, a cutting insert and a damping means, FIG. 1B shows the tool in a top view, FIG. 1C shows the tool in a rear view, FIG. 1D shows the tool in a front view, FIG. 1G illustrates the grooving blade of FIG. 1F in a front view showing the damping means in an exploded view, FIG. 1H shows the damping means in a front view, FIG. 1I shows a cross section according to the line 1I-1I in FIG. 1H.

Figure 1E:
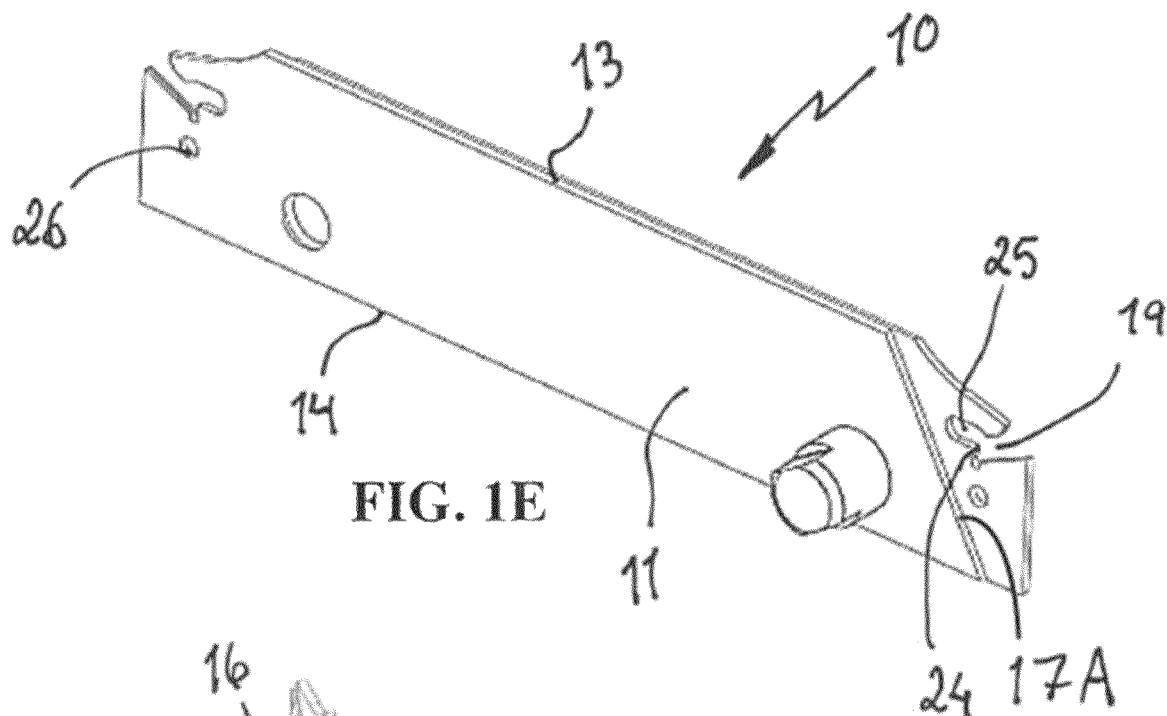
FIG. 1E shows a grooving blade according to the present invention in a perspective front view.
Figure 1F:
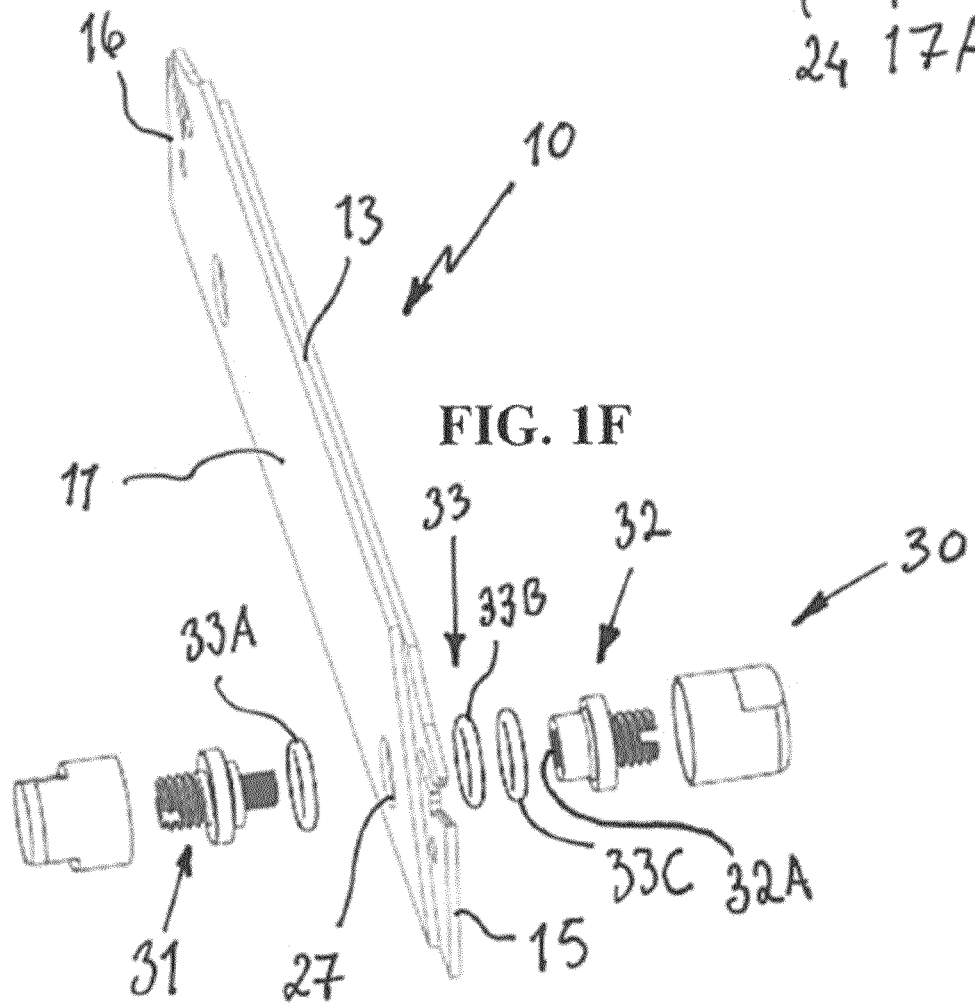
FIG. 1F illustrates the grooving blade, in another perspective front view showing the damping means in an exploded view.

Each figure in the drawings is drawn to scale. However, sizes of the cutting tool or damping means may be reduced or enlarged by a certain amount.

DETAILED DESCRIPTION OF THE INVENTION

The cutting or grooving tool shown in the figures comprises a grooving blade 10 in form of a thin plate. The blade comprises opposing first 11 and second 12 side surfaces, or major surfaces, extending between parallel first 13 and second 14 longitudinal mounting edges and between opposing first 15 and second 16 end edges which extend transverse to the longitudinal mounting edges, and wherein a cutting insert pocket is associated with the first longitudinal mounting edge 13 and the first end edge 15. The largest perpendicular distance between the major surfaces defines the blade width Wb. Often the blade width Wb is constant and chosen in the range of 3-10 mm. For the current solution the blade width Wb may be chosen in the range of 1-10 mm. The first and second longitudinal mounting edges 13, 14 define a midline M between them (FIG. 1A). The first and second longitudinal mounting edge 13, 14 each has an approximately V-shaped convex cross section. The first 11 and second 12 side surfaces define a midplane C of the blade between them (FIG. 1G).

In the shown embodiment, a recess 17, 18 is formed in each major surface 11, 12 proximate the end edge 15 and 16, respectively. The recess is provided to reduce the width of the blade at the end edge that is supposed to enter into a slot being generated in a workpiece W. Presence of the recess is optional but it is usually necessary for the machining of relatively narrow slots such as widths of 1 to 4 mm to provide clearance from walls of the slot. If present, a border 17A of the recess 17 will define the largest radius R of the solid workpiece W that can be parted with such a blade, or the greatest wall thickness of a pipe. The border 17A may be non-perpendicular to the midline M, such as by forming an acute angle in the range of 50 to 70°.

Figure 2A:
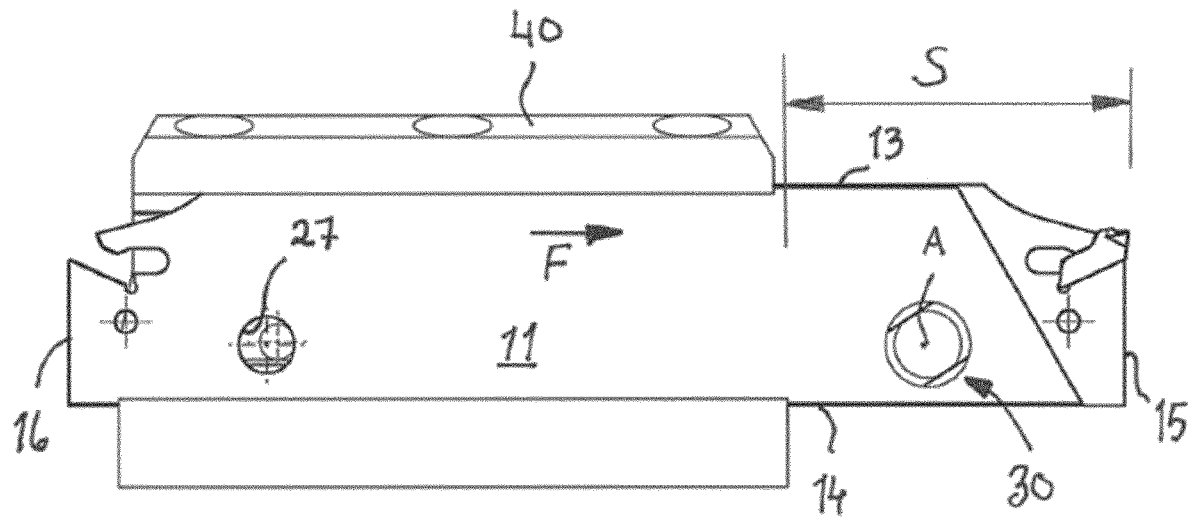
FIG. 2A shows the tool secured to a toolholder in a side view.

The first 11 and second 12 side surfaces may extend parallel to a normal cutting feed direction F of the blade (FIG. 2A). The first 11 and second 12 side surfaces may extend in a plane perpendicular to a rotational axis of the metal workpiece W in which a groove is formed.

The blade 10 is provided with one or more insert pockets 19 for a cutting insert 20. In general, the cutting insert 20 is formed of a material which is harder and more wear resistant as compared to the material of the grooving blade. For example, the cutting insert is typical made from cemented carbide, cermet or ultra-hard cutting materials, such as PCD or CBN, or combinations thereof. The cutting insert can be coated or uncoated. The insert pocket is defined by a supporting surface 21 and a clamping surface 22 on a clamping arm 23 which is integral with the blade 10. Alternatively, the clamping arm 23 can be a separate member fixed to the blade by for instance screwing or riveting. In order to positively secure the cutting insert in its pocket both the two surfaces 21, 22 and the corresponding top and bottom surfaces of the cutting insert cooperating therewith are at least partially V-shaped in cross section. The pocket 19 may have an insert stop surface 24 and a slot 25 in a conventional manner, the latter for increasing the flexibility of the clamping arm 23. At least one first through hole 26 may be formed close to the pocket, in this case, below the pocket. The hole 26 is intended to act as a reaction surface for an insert mounting and/or demounting tool (not shown). The insert mounting and/or demounting tool may have two pins: one that will be positioned in the hole 26 and one that will be positioned in the slot 25 to facilitate removal of the insert from the pocket in a conventional manner. In this case the pocket 19 is provided above or substantially above the midline M as seen in FIG. 1A.

The grooving blade has at least one second through hole 27, whose axis extends perpendicular or substantially perpendicular through the side surfaces 11, 12. The hole 27 diameter widens towards the midplane C of the blade, which entails that the intersections with the surfaces 11 and 12 define smaller diameters than the hole diameter at the midplane. The second through hole 27 may be positioned below the midline M as seen in FIG. 1A. The second through hole 27 may be intersected by a line L which forms an imaginary extension of the supporting surface 21.

The grooving blade comprises damping means 30 or has a damping means 30 fixed thereto. The blade 10 can thus be denominated a damped grooving blade comprising a blade and damping means.

The damping means 30 is intended to reduce the amplitude of an oscillation as a result of energy being drained from the grooving blade by allowing a weight resiliently attached to the blade to oscillate out of phase with the oscillation of the blade.

Figure 1J:
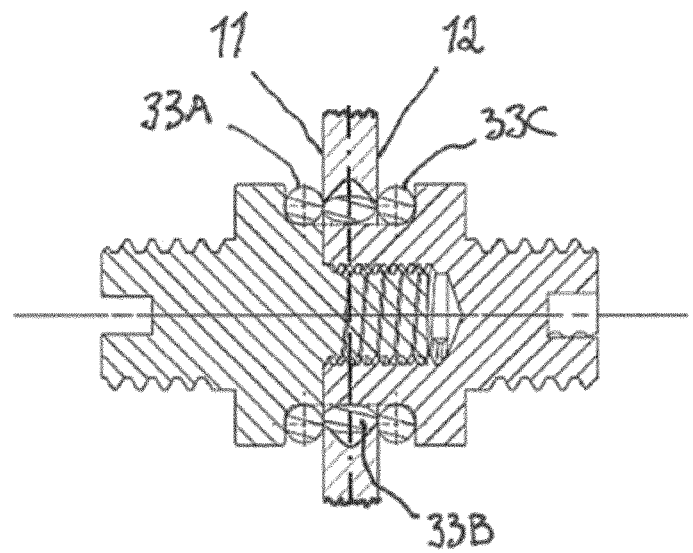
FIG. 1J shows a cross section of damping elements mounted to a blade.

The damping means 30 is intended to project laterally in the general meaning of across or crosswise with respect to at least one of the major surfaces 11, 12 of the blade, such that 10 to 98%, preferably 30 to 95% of its mass is located outside of planes defined by the major surfaces 11, 12 as seen in FIG. 1J. In the shown embodiment the damping means extends perpendicularly to both of the major surfaces 11, 12. The damping means 30 projects on both the major surfaces of the blade, preferably symmetrically.

The damping means 30 is spaced from the first 13 and second 14 longitudinal mounting edges of the blade, and may be located closer to the second longitudinal mounting edge than to the first longitudinal mounting edge 13.

The damping means may be releaseably mountable in the second through hole 27 of the blade 10. The damping means may be positioned below the midline M and/or may be intersected by the line L. The damping means has a width Wd which is greater than the width Wb of the blade. A central portion of the damping means is accommodated in in the second through hole 27, as illustrated in FIG. 1J.

The damping means 30, as best shown in FIGS. 1F to 1J, comprises damping elements such as a screw 31 and a nut 32 and elastic elements 33 such as rubber O-rings 33A, 33B and 33C. The screw 31 and the nut 32 act as weights and may be formed of a material of denser (such as tungsten carbide), equal (such as steel) or less dense than the material of the blade. The metal parts of the damping elements may be comprised of only two parts to avoid additional features such as a separate screw.

The screw 31 has an externally threaded portion 31A connected via a shoulder surface 34 to a circumferential seat 31B of larger diameter than the threaded portion. The seat 31B connects to an externally threaded spigot 31C having a keyway or slot 31D at a free end thereof.

The nut 32 has an internally threaded sleeve 32A having an external surface 32E connected to a circumferential seat 32B of larger diameter than the threaded portion. An abutment surface 37 is provided in connection with the free end of the sleeve 32A. The internal thread of the sleeve 32A is compatible with the externally threaded portion 31A. The seat 32B connects to an externally threaded spigot 32C having a keyway or slot 32D at a free end thereof. The external surface 32E may be cylindrical or have other suitable shapes.

The damping means may be covered by caps 35. Each cap 35 is suitably provided with key grips 36.

The damping means is mounted for instance as follows, as best illustrated in FIGS. 1G and 1J. One elastic element 33 such as the O-ring 33B is mounted in the through hole 27 by compressing the O-ring to pass the smallest diameter of the through hole and then let it expand therein. The through hole 27 has a geometry as described to form a seat for and to retain or secure the O-ring to the blade. Another elastic element 33 such as the O-ring 33A is mounted in the seat 31B on the screw 31. Still another elastic element 33 such as the O-ring 33C is mounted in the seat 32B on the nut 32, thereby leaving an end or free space on the external surface 32E for accepting the blade secured O-ring 33B. The sleeve, i.e. the free space on the external surface 32E is forced through the secured O-ring 33B, suitably until O-rings 33B and 33C come into contact with each other. The screw 31 with the O-ring 33A is then brought with its externally threaded portion 31A into contact with the mating internal thread of the nut 32. When rotating the screw 31 relative to the nut 32 by means of the key grips 31D and 32D, respectively, the outer O-rings 33A and 33C will come into contact with the central O-ring 33B and be compressed until the shoulder surface 34 of the nut 31 abuts against the abutment surface 37 of the nut 32. The damping means is thereby securely held to the blade.

In this case the metal parts 31, 32 of the damping means 30 are made from solely two pieces, without any separate fastening member, which form a single rigid body that is movable relative to the blade 10.

The damping means may be covered by caps 35 by securing each cap to the blade itself by for example gluing. Each cap 35 is in non-contact with the damping means, i.e. there is a continuous gap between the cap and the damping means. The caps protect the damping elements from the environment such as from debris and impacts. The key grip 36 of the cap can be used for removing the cap from the blade by rotation thereof to break the glue such that the damping elements can be manipulated. Additionally, the caps prevent inadvertent changes of the vibration damping effect of the dampening means by a user.

The position of the damping means 30 in the shown embodiment is a direct consequence of where the second through hole 27 is placed. Thus, the damping means may be positioned below the midline M and it may be intersected by the line L which forms an imaginary extension of the supporting surface 21.

The blade 10 with the cutting insert is intended to be mounted in a conventional blade holder 40 and has an overhang S (shown in FIG. 2A), which is the lever or distance from the active cutting edge to the tool holder 40. The cutting insert may have a cutting edge with a width We, which is smaller than the largest width Wb of the blade. The width We may be 1 to 4 mm.

The damping means 30 may be placed at any place in the longitudinal direction of the blade as long as it is spaced from the workpiece W and the toolholder 40. Alternatively, the toolholder may have a recess (not shown) to accommodate one part of the damping means such to allow increased setting length of the blade. Normally the damping means is positioned as close as possible to the active cutting edge. In the shown embodiment in FIGS. 2A and 2B the center axis A of the damping means is located at least one, preferably more than two, diagonal insert lengths IL away from the active cutting edge and preferably at least one insert length IL from the tool holder. The overhang S may be less than two-and-a-half times the diameter of the workpiece W. In general, the recommended overhang is 8 to 10 times the insert width, but when using part-off blades, it is common to exceed that width.

Thus, the tool contains a passive damping device that is dynamically tunable. The tuning process establishes the tools frequency and then positions the damper so the blade's frequency is constantly out of phase. In the out of phase condition, the motion of the damping means is used to suppress the blade's vibration or tendency to chatter. In essence, the energy in the system is absorbed by the damper and not released by the tool in the form of chatter.

Figure 3:
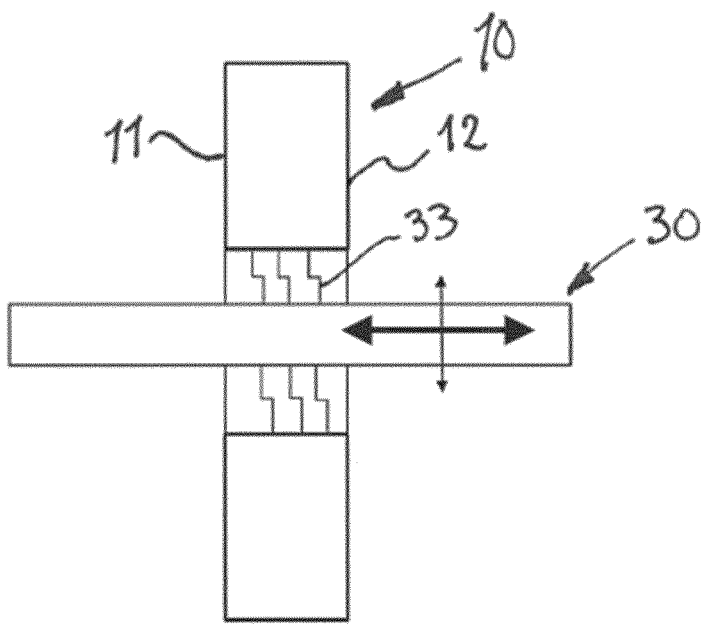

FIG. 3 schematically illustrates how the damping means is intended to move during operation. The blade 10 is relatively weak in a direction perpendicular to the major surfaces 11 and 12, and the arrows in such direction are drawn large in FIG. 3. The other two arrows in a direction parallel to the major surfaces are drawn small in FIG. 3 since oscillations in that direction are relatively small. Stated another way, the blade is more sensitive to lateral bending than to vertical bending.

The damped grooving blade may have a blade passageway (not shown) configured for conveyance of coolant that extends from a blade inlet aperture formed in at least one of the major surfaces 11, 12 to one or two outlet apertures located at the cutting insert pocket. The blade passageway is spaced from the damping means 30.

Tool life generally increases with increase in coolant supply pressure. This can be attributed to the ability of the high-pressure coolant to lift the chip and gain access closer to the cutting interface. This action leads to a reduction of the seizure region, thus lowering the friction coefficient, which in turn results in reduction in cutting temperature and cutting forces. Preferably the pressure used in the discussed embodiments is above 30 bar, preferably above 100 bar coolant pressure.

The damping means may alternatively comprise a magnetic plate attached to a housing containing a visco-elastic damper such as a metal ball in a fluid positioned on one or both of the major surfaces of the blade. In such a case there is no need for holes to mount the damping means.

The damping means is preferably located remote from the groove which enhances the degree of freedom to construct and design the damping means.

Figure 2B:
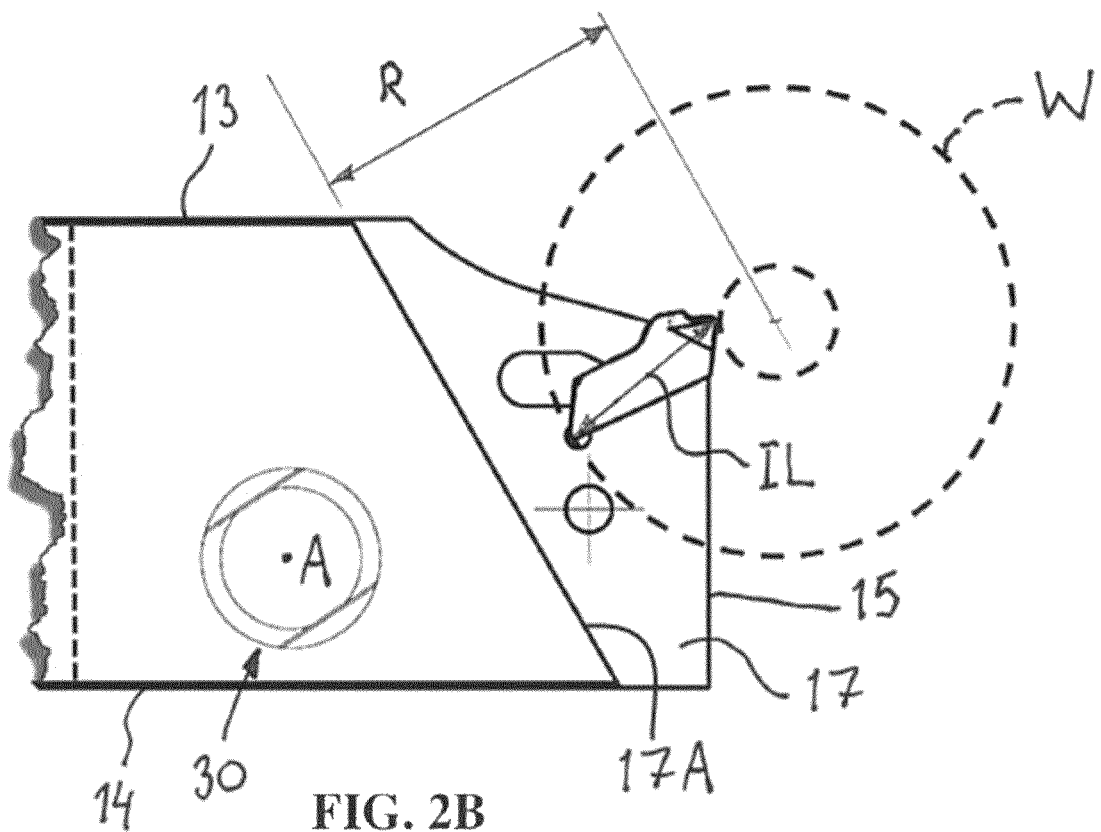
FIG. 2B shows a front portion of the tool in a side view in engagement with a workpiece, and FIG. 3 schematically illustrates how the damping means is intended to move during operation.

A method of grooving a metallic workpiece, with such a grooving tool is also disclosed. The grooving blade 10 with the cutting insert 20 is mounted in a blade holder 40 creating an overhang S. The blade holder 40 is mounted to a lathe to be able to cut radially or axially relative to a rotational axis of the workpiece W. The method may comprise the steps of moving the grooving tool towards the rotating workpiece such that the cutting edge thereof produces a groove by removal of chips, maintaining the movement of the grooving tool until desired groove depth is obtained while keeping the damping means remote from the workpiece. By "remote" is here meant that the damping means is always radially or axially outside of or spaced from the groove. In case of a radial grooving operation as illustrated in FIG. 2B the damping means 30 is spaced from the external surface (as depicted by a dashed circle in the figure) of the workpiece W. The damping means is thus located in-between the tool holder 40 and the maximum intended depth of the groove. The maximum intended depth of grooving is often determined by a border 17A of the recess 17, if present.

Grooving is single-point machining operations performed on lathes, automatic lathes, or machining centers and comprises several different variants such as recessing operations, sometimes also called necking operations, which are often done on workpiece shoulders to ensure the correct fit for mating parts, face grooving operations when the tool is fed axially rather than radially toward the end surface of the workpiece, internal grooving, and parting operations where the workpiece rotates while the tool carries out a radial feed movement. The term "grooving" used in the text includes all said variants.

In the present application, the use of terms such as "including" is open-ended and is intended to have the same meaning as terms such as "comprising" and not preclude the presence of other structure, material, or acts. Similarly, though the use of terms such as "can" or "may" is intended to be open-ended and to reflect that structure, material, or acts are not necessary, the failure to use such terms is not intended to reflect that structure, material, or acts are essential. To the extent that structure, material, or acts are presently considered to be essential, they are identified as such. Terms such as "upper", "lower", "top", "bottom", "forward" and "rear" refer to features as shown in the current drawings and as perceived by the skilled person.

While this invention has been illustrated and described in accordance with a preferred embodiment, it is recognized that variations and changes may be made therein without departing from the invention as set forth in the claims.

The disclosures in EP Patent Application No. 16162258.4, from which this application claims priority, are incorporated herein by reference.

The invention claimed is:

1. A grooving tool for grooving a rotating metallic workpiece, the tool comprising:

a grooving blade having at least one major surface, at least one cutting insert pocket, and a damping arrangement fixed to the blade, wherein the damping arrangement projects laterally with respect to the at least one major surface of the blade and at least one cutting insert fixed to the at least one cutting insert pocket, wherein the grooving blade has a maximum width and the damping arrangement has a maximum width that is greater than the maximum width of the grooving blade, and wherein the at least one cutting insert has a cutting edge with a width, said cutting edge width being smaller than a maximum width of the blade, and wherein the maximum width of the damping arrangement is greater than the width of the cutting edge.

2. The grooving tool according to claim 1, wherein the at least one major surface comprises two major surfaces, and wherein the damping arrangement projects from both major surfaces of the blade.

3. The grooving tool according to claim 1, wherein the maximum width of the damping arrangement is 2 to 15 times greater than the maximum width of the blade.

4. The grooving tool according to claim 1, wherein the damping arrangement is releaseably fixed to the blade.

5. The grooving tool according to claim 1, further comprising at least one lateral through hole arranged to receive only a portion of the damping arrangement.

6. The grooving tool according to claim 1 the at least one major surface comprises opposing first and second major surfaces extending between parallel first and second longitudinal mounting edges and between opposing first and second end edges which extend transverse to the longitudinal mounting edges, and wherein the at least one cutting insert pocket is associated with the first longitudinal mounting edge and the first end edge.

7. The grooving tool according to claim 1, wherein a blade passageway configured for conveyance of coolant extends from a blade inlet aperture formed in the at least one major surface to an outlet aperture located at the at least one cutting insert pocket and wherein the blade passageway is spaced from the damping arrangement.

8. The grooving tool according to claim 1, wherein the damping arrangement is intersected by a straight line which forms an imaginary extension of a lower supporting surface of the at least one cutting insert pocket.

9. The grooving tool according to claim 1, wherein the damping arrangement has a center axis and the at least one cutting insert has opposed ends, wherein an active cutting edge is disposed at one end and the at least one cutting insert has a insert length that extends between the opposed ends, and wherein the center axis of the damping arrangement is located at a distance of at least one insert length of the at least one cutting insert away from the active cutting edge.

10. The grooving tool according to claim 1, wherein the damping arrangement is fixed to the blade by of a screw connection or one or more magnets.

11. A method of grooving a rotating metallic workpiece with a grooving tool, the method comprising the steps of:
providing a grooving tool according to claim 1;
moving the grooving tool towards a rotating workpiece such that a cutting edge thereof produces a groove in the workpiece by removal of chips thereof;
moving the grooving tool until a desired groove depth is obtained while keeping the damping arrangement remote from the workpiece.

* * * * *